US012574578B2

(12) United States Patent (10) Patent No.: US 12,574,578 B2
Bitah (45) Date of Patent: Mar. 10, 2026

(54) SYSTEM AND METHOD FOR CONTROLLING VIEWERSHIP OF AN EVENT

(71) Applicant: Isaiah Bitah, Gallup, NM (US)

(72) Inventor: Isaiah Bitah, Gallup, NM (US)

(73) Assignee: Isaiah Bitah, Gallup, NM (US)

( * ) Notice: Subject to any disclaimer, the term of this patent is extended or adjusted under 35 U.S.C. 154(b) by 0 days.

(21) Appl. No.: 18/507,091

(22) Filed: Nov. 13, 2023

(65) Prior Publication Data

US 2024/0244283 A1 Jul. 18, 2024

Related U.S. Application Data

(60) Provisional application No. 63/438,561, filed on Jan. 12, 2023.

(51) Int. Cl.
*H04N 21/266* (2011.01)
*G06T 7/00* (2017.01)
*H04N 21/218* (2011.01)

(52) U.S. Cl.
CPC ......... *H04N 21/266* (2013.01); *G06T 7/0002* (2013.01); *H04N 21/21805* (2013.01)

(58) Field of Classification Search
CPC ........... H04N 21/266; H04N 21/21805; H04N 21/23418; H04N 21/252; H04N 21/2743; H04N 21/4667; G06T 7/0002
See application file for complete search history.

(56) References Cited

U.S. PATENT DOCUMENTS

| | | | | |
|---|---|---|---|---|
| 9,098,807 | B1 * | 8/2015 | Samaniego | ............ G06N 5/022 |
| 10,242,034 | B1 * | 3/2019 | Li | ........................ G06F 16/4393 |
| 2016/0286244 | A1 * | 9/2016 | Chang | ................ H04N 21/4788 |
| 2017/0111667 | A1 * | 4/2017 | Shaw | .................. H04N 21/2387 |
| 2021/0011939 | A1 * | 1/2021 | Sardar | ..................... A63F 13/49 |

* cited by examiner

*Primary Examiner* — Alazar Tilahun

(57) ABSTRACT

Disclosed is a system for managing and transmitting multi-media content to a remote computing device over a network. The system includes a memory and a processor. The memory stores computer-executable instructions. The processor is configured to execute the computer-executable instructions to receive event entry data pertaining to entry of one or more event participants into an event. The processor is configured to receive one or more multi-media content files pertaining to the event from a plurality of user devices associated with one or more event participants. The processor is configured to assign, using a trained comparison-based model, a quality score to each of one or more multi-media content files. The comparison-based model is trained on a plurality of historical event recordings. The processor is configured to control a viewership of the event in real-time based on the quality score of each of the multi-media content files.

18 Claims, 8 Drawing Sheets

610

DETERMINE EVENT TYPE OF EVENT — 611

FACILITATE EVENT PARTICIPANTS IN UPLOADING MULTIMEDIA CONTENT FILES WITHOUT ASSOCIATING USER DATA RELATED TO EVENT PARTICIPANTS — 613

IDENTIFY ONE OR MORE OBJECTS IN MULTI-MEDIA CONTENT FILES FOR EMPHASIS — 615

ASSIGN QUALITY SCORE TO EACH OF MULTI-MEDIA CONTENT FILES BASED ON EVENT TYPE, AND AT LEAST PRESENCE OR ABSENCE, OF ONE OR MORE OBJECT — 617

GENERATE SHARABLE MULTI-PERSPECTIVE MULTI-MEDIA CONTENT FILES BASED ON MULTI-MEDIA CONTENT FILES — 619

DISPLAY NON-CLOSABLE IDENTIFIER CORRESPONDING TO EACH OF ENTRY TICKETS ON PLURALITY OF USER DEVICES — 601

RECEIVE TICKET DATA RELATING TO EACH OF ENTRY TICKETS — 603

VALIDATE ENTRY TICKETS BASED ON CORRESPONDING TICKET DATA — 605

UPON VALIDATION, FACILITATE EVENT PARTICIPANTS TO UPLOAD MULTI-MEDIA CONTENT FILES — 607

600

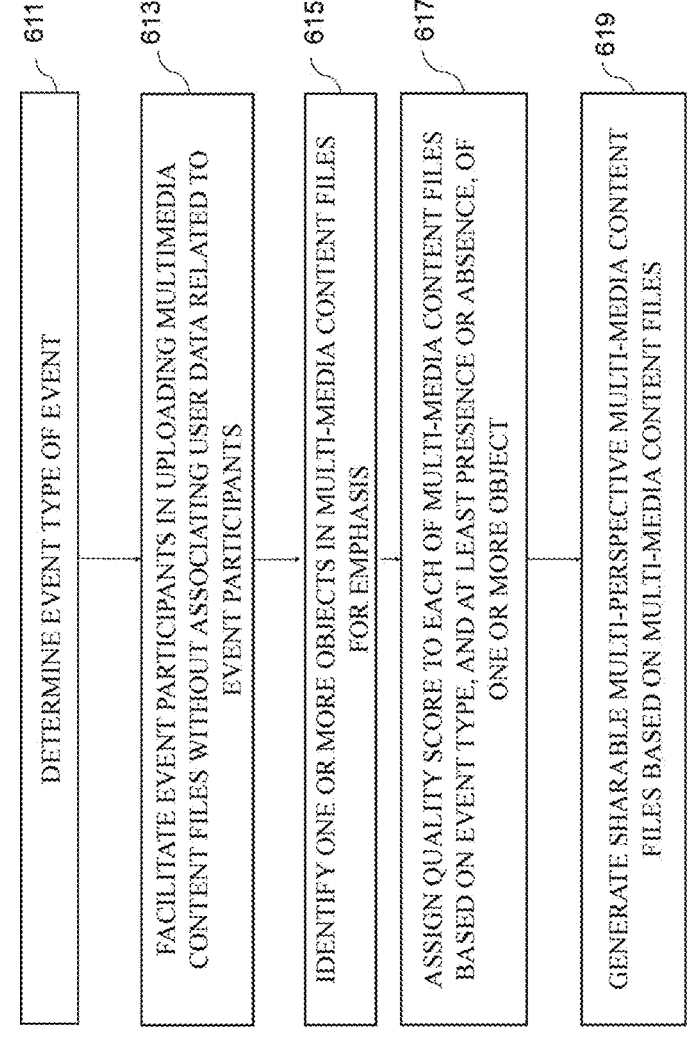

610

611 — DETERMINE EVENT TYPE OF EVENT

613 — FACILITATE EVENT PARTICIPANTS IN UPLOADING MULTIMEDIA CONTENT FILES WITHOUT ASSOCIATING USER DATA RELATED TO EVENT PARTICIPANTS

615 — IDENTIFY ONE OR MORE OBJECTS IN MULTI-MEDIA CONTENT FILES FOR EMPHASIS

617 — ASSIGN QUALITY SCORE TO EACH OF MULTI-MEDIA CONTENT FILES BASED ON EVENT TYPE, AND AT LEAST PRESENCE OR ABSENCE, OF ONE OR MORE OBJECT

619 — GENERATE SHARABLE MULTI-PERSPECTIVE MULTI-MEDIA CONTENT FILES BASED ON MULTI-MEDIA CONTENT FILES

FIG. 6B

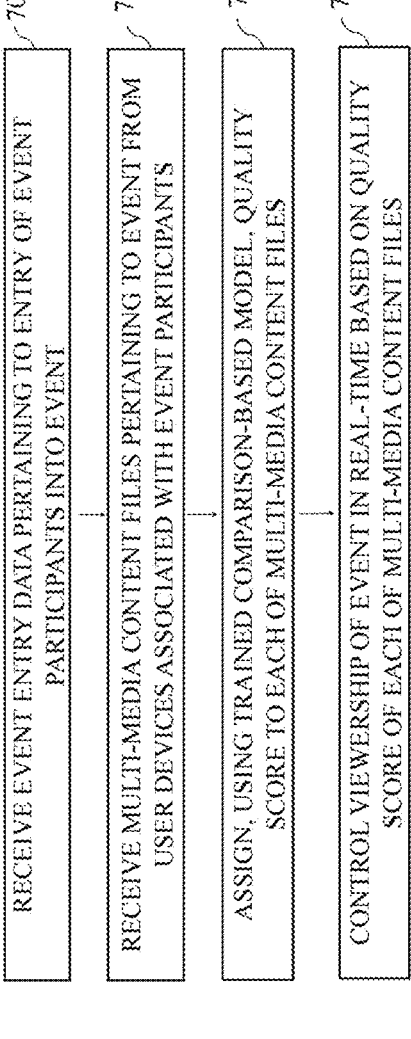

700

701 — RECEIVE EVENT ENTRY DATA PERTAINING TO ENTRY OF EVENT PARTICIPANTS INTO EVENT

703 — RECEIVE MULTI-MEDIA CONTENT FILES PERTAINING TO EVENT FROM USER DEVICES ASSOCIATED WITH EVENT PARTICIPANTS

705 — ASSIGN, USING TRAINED COMPARISON-BASED MODEL, QUALITY SCORE TO EACH OF MULTI-MEDIA CONTENT FILES

707 — CONTROL VIEWERSHIP OF EVENT IN REAL-TIME BASED ON QUALITY SCORE OF EACH OF MULTI-MEDIA CONTENT FILES

FIG. 7

SYSTEM AND METHOD FOR CONTROLLING VIEWERSHIP OF AN EVENT

TECHNOLOGICAL FIELD

The present disclosure generally relates to the data processing and management and more particularly relates to a system and method for uploading multi-media content files related to an event and controlling a viewership of the event in an event-specific manner.

BACKGROUND

Video creation and sharing platforms have assumed increasing significance in contemporary society. Video creation and sharing platforms serve as dynamic tools for event promotion and engagement, ultimately boosting the success of these gatherings. Videos, being highly engaging, capture the audience's attention more effectively than text or images. They enable event organizers to connect with their target audience on a deeper level, conveying the essence and excitement of the event. Well-crafted videos generate buzz around upcoming events, building anticipation and excitement among potential attendees. Teaser videos, event highlights, or behind-the-scenes footage can ignite interest and curiosity. These platforms also allow events to reach a broader audience, with engaging and shareable content that can potentially go viral, attracting participants who may not have initially considered attending. Moreover, videos can create a sense of FOMO (Fear of Missing Out) among viewers, making them more eager to be part of the experience. Strategic storytelling through videos conveys an event's purpose, history, and impact, fostering an emotional connection that inspires attendees and sponsors alike. Furthermore, videos can emphasize the exclusivity of an event, showcasing limited time offers and special access to encourage quick registration. Collaborating with social media influencers and content creators can extend the event's reach by having them create and share videos about the event. To this end, video creation and sharing platforms provide event organizers with a powerful toolkit to drive engagement, generate excitement, and expand their audience, making them indispensable in the realm of event promotion. These platforms empower individuals to engage in real-time video sharing, leveraging state-of-the-art visual, audio, and collaborative technologies. Nevertheless, optimizing the efficiency of video creation and sharing remains a formidable challenge, involving event organizers, system architects, application developers, and service providers. These professionals may need to contend with the evolving landscape of video-sharing platforms, each confronted by its unique set of challenges and problems.

One of the primary challenges pertains to the quality of content available on these platforms. While the quantity of content is immense, the quality can be highly variable. Users often find themselves sifting through a deluge of videos, some of which are low-quality or misleading, in search of the content they desire. This issue not only affects the user experience but also underscores the need for effective content curation and recommendation systems.

Another issue revolves around the proliferation of duplicate content. Often, the same or nearly identical videos are uploaded by multiple users, leading to redundancy and content saturation. This can create confusion among viewers and reduce the overall utility of the platform.

Additionally, there is a growing concern regarding the privacy of user data on these platforms. Users are becoming increasingly conscious of how their data is collected, used, and safeguarded. Consequently, there is a heightened demand for greater transparency and control over the handling of personal data, particularly as it relates to video sharing.

Recognizing these challenges, the present disclosure addresses the imperative for a video-sharing platform.

BRIEF SUMMARY

Various embodiments are provided herein for controlling the viewership of an event in real time. The viewership of the multi-media content is controlled based on a quality score of the multi-media content files uploaded by event participants.

Thus, as disclosed herein, the methods and systems describe the computation of quality scores of the multi-media content and controlling viewership of the events in various embodiments. The methods and systems of the present disclosure further provide better and more efficient mechanisms of onboarding event participants and allowing participants to create and upload videos.

A system and a method are provided for uploading multi-media content files related to an event and controlling the viewership of the event in real-time based on the uploaded multi-media content files. To this end, by controlling the viewership of the event based on user-shared uploaded multi-media content files, the event can be promoted in a targeted manner to a greater number of audience.

In one aspect, a system for uploading multi-media content files related to an event and controlling the viewership of the event in real-time based on the uploaded multi-media content files is provided. The system includes a memory and a processor. The memory stores computer-executable instructions. The processor is configured to execute the computer-executable instructions to receive event entry data pertaining to the entry of one or more event participants into an event. The processor is configured to receive one or more multi-media content files pertaining to the event from a plurality of user devices associated with one or more event participants. The processor is configured to assign, using a trained comparison-based model, a quality score to each of the one or more multi-media content files. The comparison-based model is trained on a plurality of historical event recordings. The processor is configured to control the viewership of the event in real-time based on the quality score of each of the multi-media content files.

In additional system embodiments, the processor is configured to: determine an event type of the event; and assign the quality score to each of the one or more multi-media content files based on the event type of the event.

In additional system embodiments, the historical event recordings correspond to a plurality of event types.

In additional system embodiments, the processor is configured to: cause to display a non-closable identifier corresponding to each of the one or more entry tickets on the plurality of user devices. The one or more entry tickets are associated with the one or more event participants. While the preferred embodiment describes a non-closable identifier, an identifier that the user is able to close after the ticket is scanned, an identifier that closes automatically immediately or a predefined period after it is scanned.

In additional system embodiments, the processor is configured to: receive ticket data relating to each of one or more entry tickets, such that the ticket data comprises at least the corresponding non-closable identifier; validate the one or more entry tickets based on the corresponding ticket data; and upon validation, facilitate the one or more event participants to upload the one or more multi-media content files.

In additional system embodiments, the processor is configured to generate one or more sharable multi-perspective multi-media content files based on the multi-media content files such that the one or more sharable multi-perspective multi-media content files have a quality score higher than the quality score of the one or more multi-media content files.

In additional system embodiments, the processor is configured to: facilitate the one or more event participants in uploading one or more multimedia content files without associating user data related to the one or more event participants.

In additional system embodiments, the processor is configured to: receive the plurality of historical event recordings; cause to train the comparison-based model based on the plurality of historical event recordings such that the comparison-based model is trained to identify a plurality of event types and assign a training score to each of the plurality of historical event recordings based on corresponding event type and viewership; and assess a suitable multi-media content file from the one or more multi-media content files for controlling viewership.

In additional system embodiments, the processor is configured to: identify one or more objects in the multi-media content files for emphasis; and assign the quality score to each of the one or more multi-media content files based on at least the presence, or absence, of the one or more objects.

In additional system embodiments, the event entry data includes but is not limited to user identification data, event data, and a timestamp of the entry to the event.

In another aspect, a method for uploading multi-media content files related to an event and controlling the viewership of the event in real-time based on the uploaded multi-media content files is provided. The method includes a step of receiving, from a server, event entry data pertaining to the entry of one or more event participants into an event. The method further includes a step of receiving one or more multi-media content files pertaining to the event from a plurality of user devices associated with one or more event participants. The method includes a step of assigning, using a trained comparison-based model, a quality score to each of one or more multi-media content files. The comparison-based model is trained on a plurality of historical event recordings. Further, the method includes a step of controlling the viewership of the event in real-time based on the quality score of each of the multi-media content files.

In additional method embodiments, the method includes a step of determining an event type of the event. The method further includes a step of assigning the quality score to each of the one or more multi-media content files based on the event type of the event.

In additional method embodiments, the method includes a step of displaying a non-closable identifier corresponding to each of the one or more entry tickets on the plurality of user devices. The one or more entry tickets are associated with the one or more event participants.

In additional method embodiments, the method includes a step of receiving ticket data relating to each of one or more entry tickets, such that the ticket data comprises at least the corresponding non-closable identifier. The method further includes a step of validating the one or more entry tickets based on the corresponding ticket data. The method then includes a step of upon validation, facilitating the one or more event participants to upload the one or more multi-media content files.

In additional method embodiments, the method includes a step of generating one or more sharable multi-perspective multi-media content files based on the multi-media content files such that the one or more sharable multi-perspective multi-media content files have a quality score higher than the quality score of the one or more multi-media content files.

In additional method embodiments, the method includes a step of facilitating the one or more event participants in uploading one or more multimedia content files without associating user data related to the one or more event participants.

In additional method embodiments, the method includes a step of receiving the plurality of historical event recordings. The method includes a step of training the comparison-based model based on the plurality of historical event recordings such that the comparison-based model is trained to identify a plurality of event types and assign a training score to each of the plurality of historical event recordings based on corresponding event type and viewership. The method includes a step of assessing a suitable multi-media content file from the one or more multi-media content files for controlling viewership.

In additional method embodiments, the method includes a step of identifying one or more objects in the multi-media content files for emphasis. The method includes a step of assigning the quality score to each of the one or more multi-media content files based on at least the presence, or absence, of the one or more objects.

In additional method embodiments, the event entry data comprises user identification data, event data, and a timestamp of the entry to the event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
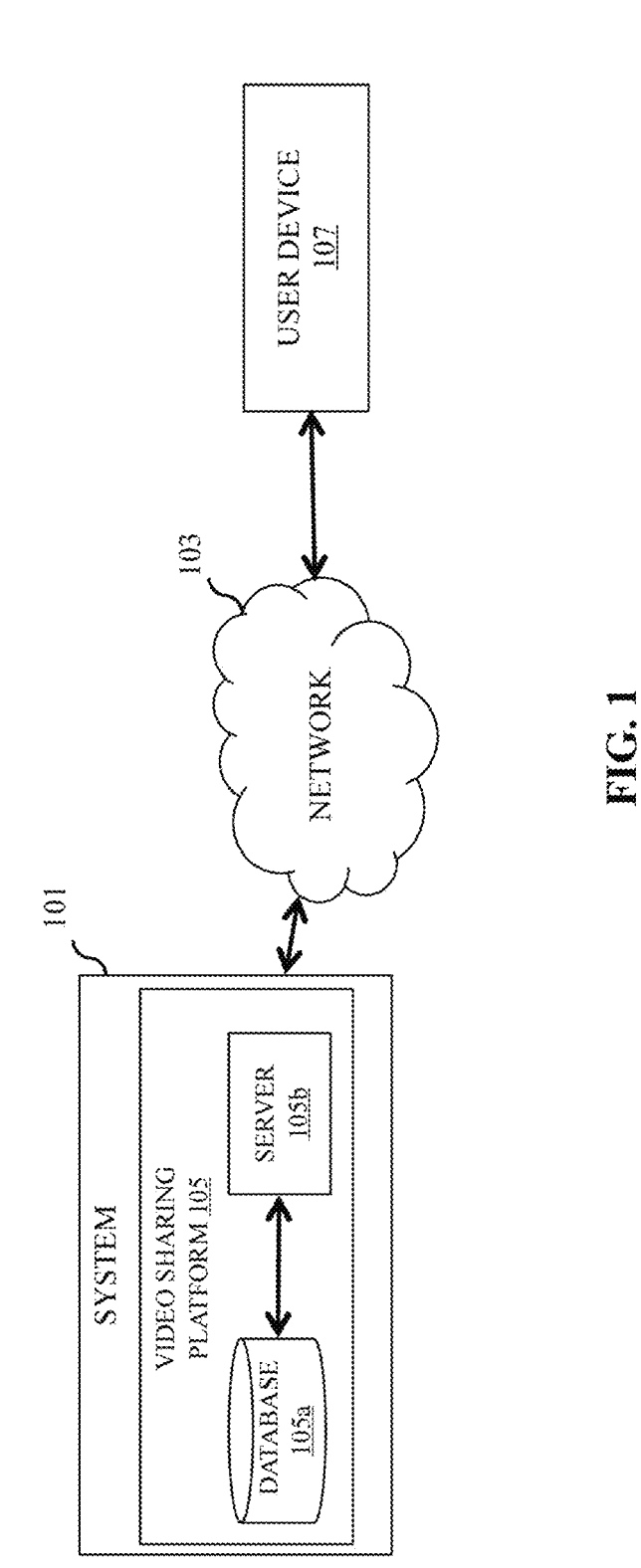

Having thus described exemplary embodiments of the disclosure in general terms, reference will now be made to the accompanying drawings, which are not necessarily drawn to scale, and wherein:

FIG. 1 illustrates a block diagram showing an example architecture of a system for controlling viewership of an event in real-time, in accordance with one or more example embodiments.

Figure 2:
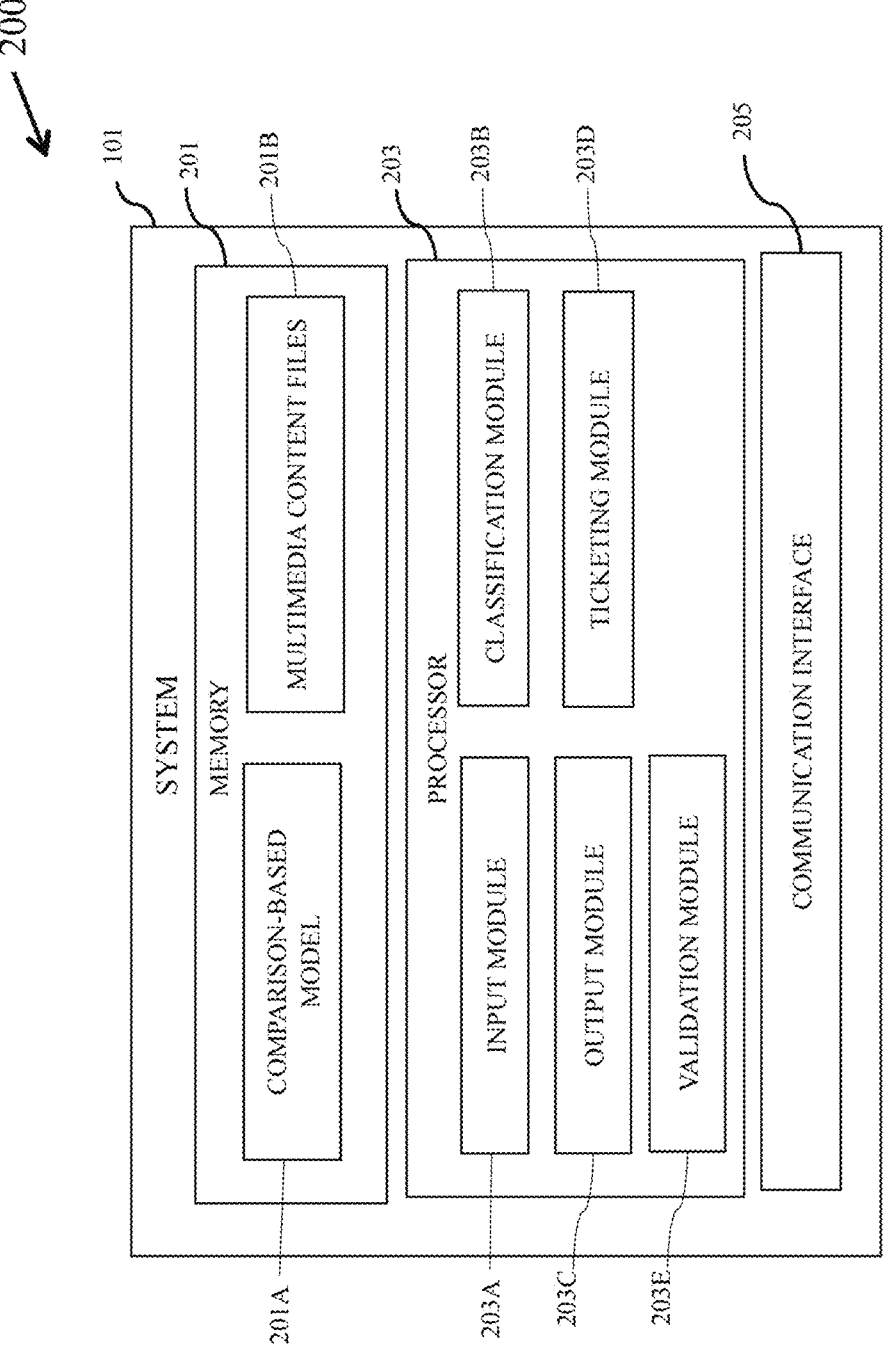

FIG. 2 illustrates an exemplary block diagram of the system for controlling viewership of the event in real-time, in accordance with one or more example embodiments.

Figure 3:
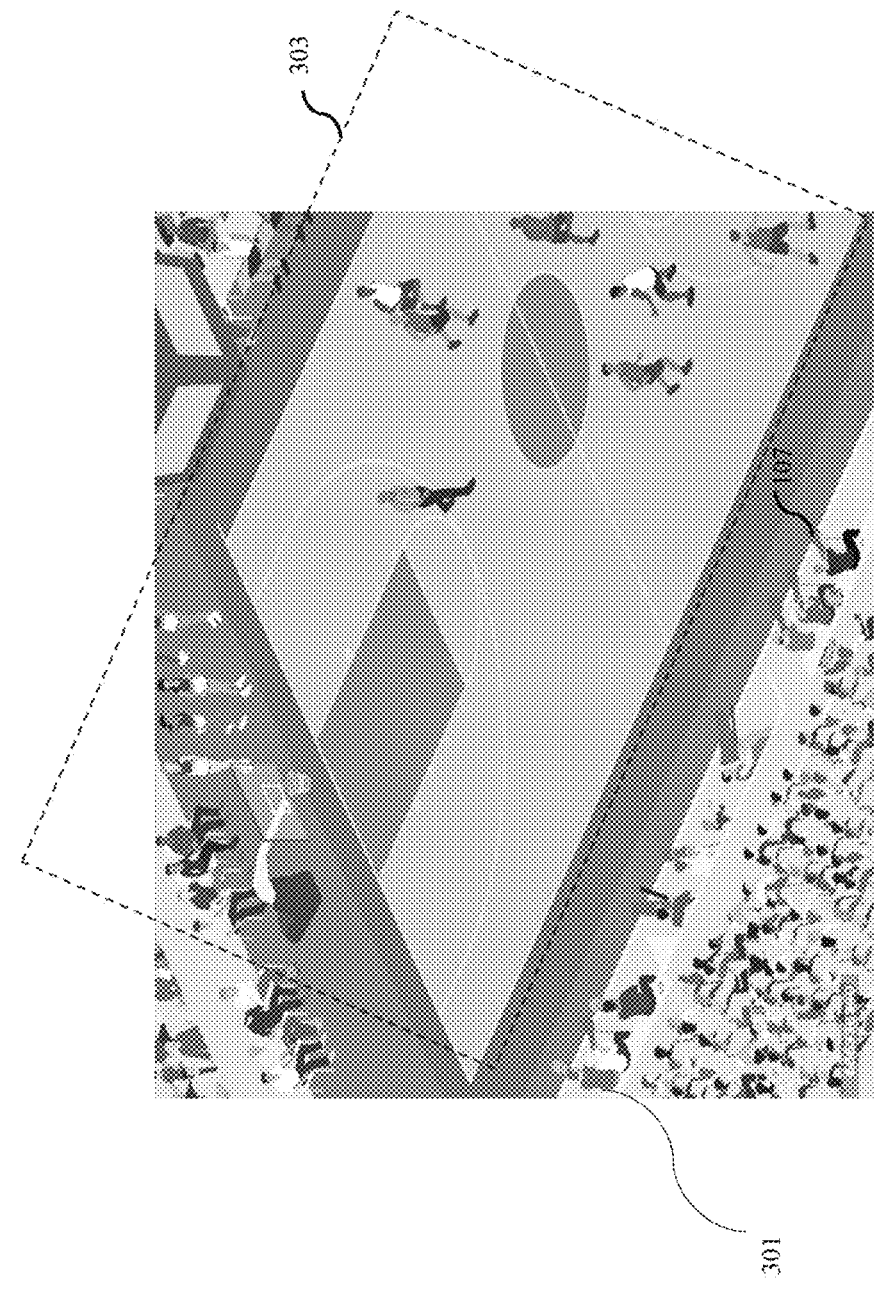

FIG. 3 illustrates a perspective view of an event participant watching an event, in accordance with one or more example embodiments.

Figure 4:
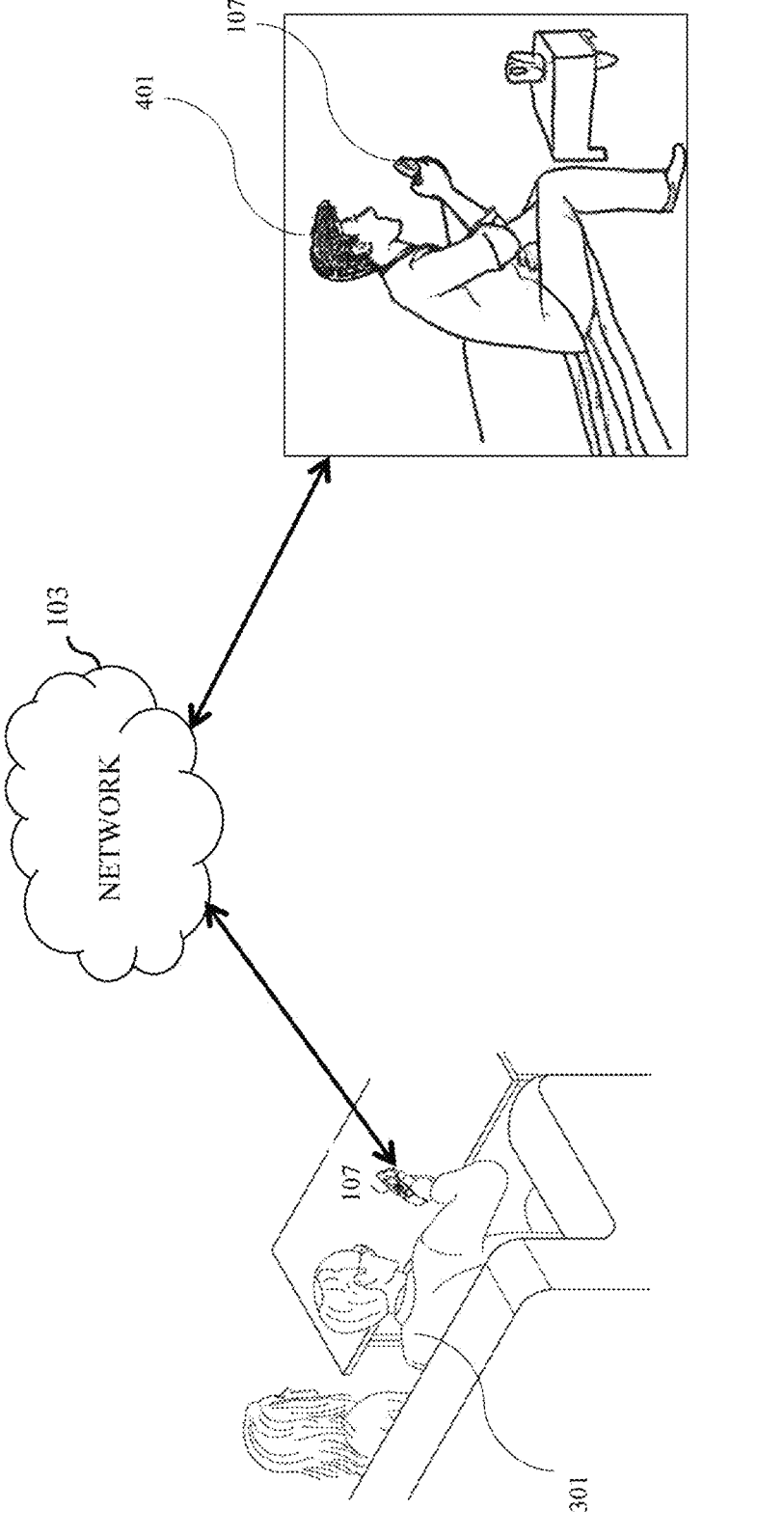

FIG. 4 illustrates a network environment within which users may interact with the system, in accordance with one or more example embodiments.

Figure 5:
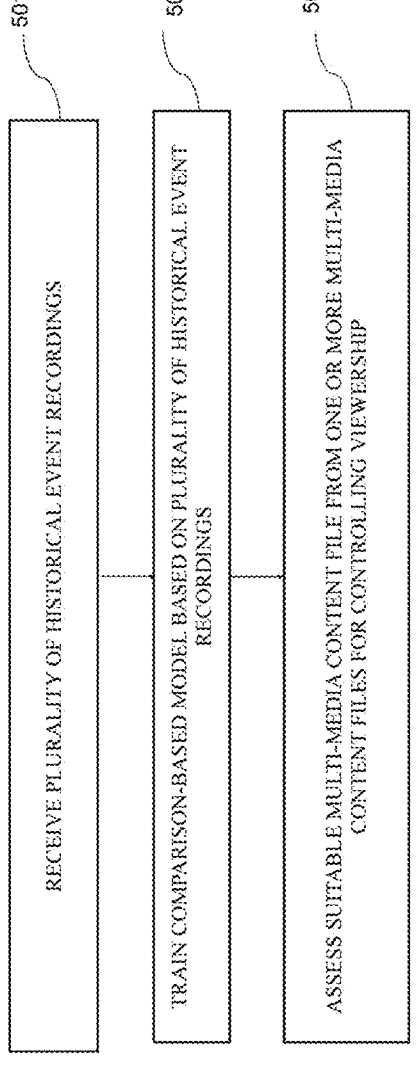

FIG. 5 is a flowchart of a method for training the comparison-based model, in accordance with one or more example embodiments.

Figure 6A:
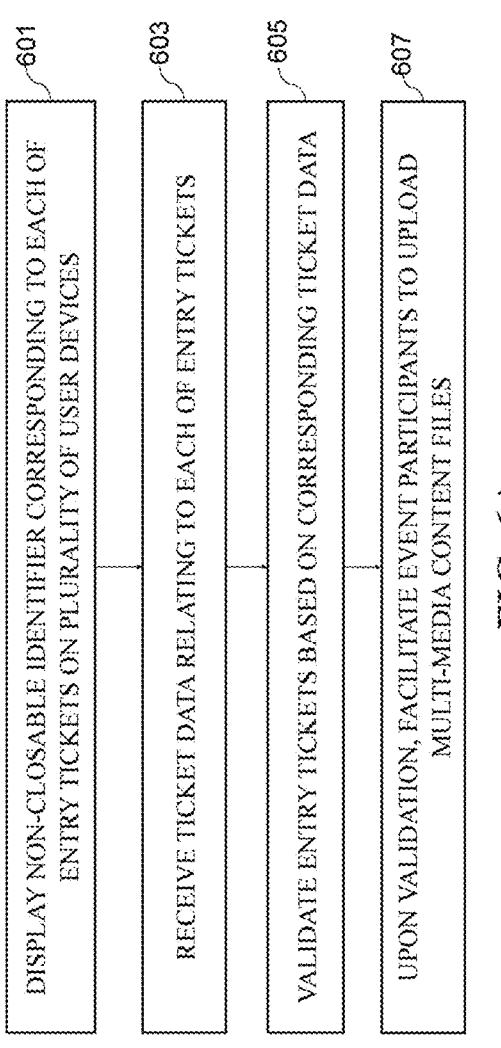

FIG. 6A is a flowchart of a method for enabling entry of one or more event participants, in accordance with one or more example embodiments.

FIG. 6B is a flowchart of a method for generating a video, in accordance with one or more example embodiments.

FIG. 7 is a flowchart of a method for controlling viewership for an event, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily all refer to the same embodiment, nor are separate or alternative embodiments mutually exclusive of other embodiments. Further, the terms "a" and "an" herein do not denote a limitation of quantity but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, and/or stored in accordance with embodiments of the present disclosure. Thus, the use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer-readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network devices, and/or other computing devices.

As defined herein, a "computer-readable storage medium," which refers to a non-transitory physical storage medium (for example, a volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for controlling the viewership of an event in real-time. The viewership of the multi-media content is controlled based on a quality score of the multi-media content files uploaded by event participants. In particular, the multi-media content files uploaded by the event participants may enable event participants to engage with each other without being exposed to any risk associated with exchange of personal information. Furthermore, based on user-generated data, the event is showcased in front of other users who would be engaged or interested in the event as well as have a higher chance of attending events similar to the event. Due to targeted promotion, conversion rate for other events similar to the event may increase drastically. Accordingly, one advantage of the present system is that it facilitates the creation and exclusive sharing of event videos on a video-sharing platform. Furthermore, the present system and method empower real-time control over the viewership of events, based on the videos uploaded by event participants. These advancements aim to enhance the overall user experience along with improved engagement for the events the and bring clarity to the complexities of video sharing in the modern digital landscape. Further, the present system controls the viewership to provide curated content and enhance the engagement while enabling strategic messaging and marketing.

As may be understood, there is an over saturation of content, information, and news in the digital market. This makes it challenging for business owners or brands to advertise their products or services appropriately. For example, event organizers are typically unable to attract the right people due to lack of creative control over their content. Moreover, content generated for the events may not correctly cover the event. As a result, users engaging with the content may be dissatisfied. To overcome the aforementioned problems, the present disclosure provides techniques for controlling viewership of content relating to an event in a brand-specific and/or event-specific manner.

FIG. 1 illustrates a block diagram 100 showing an example architecture of a system 101 for uploading multimedia content files related to an event and controlling a viewership of the event, in accordance with one or more example embodiments. As illustrated in FIG. 1, the block diagram 100 may comprise the system 101, a network 103, and a video sharing platform 105. In an example, the system 101 includes the video sharing platform 105 or the video sharing platform 105 may be collocated within the system 101. The video sharing platform 105 may include a database 105a and a server 105b (also referred to as a multi-media server 105b, or a remote server 105b associated with a customized multi-media content provider). The components described in the block diagram 100 may be further broken down into more than one component such as a mobile application or web application installed in a plurality of user devices 107 and/or combined in any suitable arrangement. Further, it is possible that one or more components may be rearranged, changed, added, and/or removed without deviating from the scope of the present disclosure.

In some embodiments, the system 101 may be embodied as a cloud-based service, a cloud-based application, a cloud-based platform, a remote server-based service, a remote server-based application, a remote server-based platform, or a virtual computing system. In each of the embodiments, the system 101 may be communicatively coupled to the components shown in FIG. 1 to carry out the desired operations and wherever required modifications may be possible within the scope of the present disclosure.

In various embodiments, the system 101, the video sharing platform 105, and the user devices 107 are connected over the network 103 for data transmission. The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The database 105a may store data relating to the multi-media content files. The database 105a may additionally store data relating to event participants, event types, and entry tickets.

In operation, the system 101, or the server 105b may receive event entry data pertaining to entry of one or more event participants into an event. The event entry data may be received from one or more user devices 107 over the network 103. In various embodiments, the user devices 107 may be associated with the one or more event participants that may be attending the event. Examples of a user device may include, but is not limited to, a smartphone, a mobile phone, a computing device, a tablet, or a laptop. In an example, the user devices 107 may be used by the event participants to record one or more fan cam video. These fan cam videos are recorded from the audience's perspective expressing their admiration and may only focus on one performer or a group member at a time. To this end, these fan cam videos are received and stored as multimedia content files by the system 101.

In some embodiments, examples of the event include, but are not limited to a sporting event, an exhibition, a music concert, a festival, a graduation ceremony, a trade show, a charity fundraiser, an art gallery opening, a product launch, a movie premiere, a cultural celebration, an awards ceremony, a wedding, a birthday party, a conference, and a business seminar. In various embodiments, one or more event participants are individuals who attend, engage, or play various roles in the event such as a viewer, a performer, an attendee, a guest, an organizer, and an audience participant.

Thereafter, the system 101 or the server 105b may receive one or more multi-media content files pertaining to the event from the user devices 107 associated with the one or more event participants. For example, the one or more multi-media content files may be video files. In an example, the multi-media content files may be short-form video files, like short clips, reels, etc. long form video recordings, and short image sequences. In certain cases, the one or more multi-media content files may also include other media, such as images, audio, etc.

Further, the system 101 or the server 105b is configured to assign a quality score to each of the multi-media content files using a trained comparison-based model (shown in FIG. 2). The comparison-based model is trained on various historical event recordings to identify, for example, patterns of videography in different events. Based on the training, the comparison-based model may assign the quality score to each of the multi-media content files based on corresponding content as well as event type of the event.

Thereafter, the system 101 is configured to regulate or control real-time viewership of the event based on the quality score of each multi-media content file. In this manner, the contents for the event are provided to other users in a controlled manner. This may improve perception of the event and a brand associated with the event in front of users, for example, users who might be interested in the event and couldn't attend the event, as well as users who are present in the event can view the content in a controlled manner.

For example, the system 101 or the video sharing platform 105 may also provide opportunity to the event participants to engage in conversations and/or share their activities and content while attending the event. This may further create exclusivity for the event participants.

Further, the system 101 can perform a range of functions, including ticket validation, compilation of videos, and facilitating discussions among event participants and users.

FIG. 2 illustrates an exemplary block diagram 200 of the system 101, in accordance with one or more example embodiments. FIG. 2 is explained in conjunction with FIG. 1. The system 101 includes a memory 201, a processor 203, and a communication interface 205. The memory 201 is configured for storing computer-executable instructions, a comparison-based model 201A, and one or more multi-media content files 201B that may be uploaded by event participants. The processor 203 is coupled to the memory 201 and executes the computer-executable instructions.

In an example, the processor 203 includes various modules, such as an input module 203A, a classification module 203B, an output module 203C, a ticketing module 203D, and a validation module 203E.

In operation, the processor 203, specifically, the input module 203A, is configured to receive user data for ticketing. For example, the user data may include, but is not limited to, name, gender, age, email, etc. Further, the user data is received to generate a ticket for the user for entry to an event.

In this regard, the ticketing module 203D is configured to generate an entry ticket for the user. The user becomes an event participant when they enter the event using the entry ticket. Further, on the day of the event and some time, for example, 2 hours, 1 hour, 30 minutes or 10 minutes, or any amount of time before the start time of the event, the ticketing module 203D is configured to display a non-closable identifier corresponding to an entry ticket of the user or the event participant on a user device associated with the event participant.

The processor 203, specifically, the ticketing module 203D, is configured to generate and display a non-closable identifier corresponding to each of the one or more entry tickets on the plurality of user devices associated with different users who purchased tickets for the event. In an embodiment, the non-closable identifier is a QR (Quick Response) code, a barcode that can be read easily by a digital device or a scanner, or any type of ticket identifier. The one or more entry tickets are associated with the one or more event participants. The processor 203 is then configured to receive ticket data relating to each of one or more entry tickets, such that the ticket data comprises at least the corresponding non-closable identifier.

In this manner, the non-closable identifier may be used by the event participant to gain entry or access to the event. In such a case, the input module 203A may further receive event entry data relating to the event participant from the user device of the event participant. In this manner, the input module 203A may receive event entry data relating to one or more entry tickets for entering the event.

In an embodiment, the event entry data includes, but is not limited to, user identification data (such as, name, gender, identification number, etc.), event data (such as, event type, event venue, event date, event time, event host, event policies, etc.), ticket data (such as ticket id) and a timestamp (or time of entry) of the entry to the event. In an example, the event entry data from a user is associated with an entry ticket of the user that may be presented by an event participant before entering the event.

Moreover, the validation module 203E is configured to validate the one or more entry tickets based on the corresponding event entry data. For example, based on a ticket id in the received event entry data from a user device of an event participant, the entry ticket for the event participant may be validated. In certain cases, the validation further requires verification of biometric data of the event participant or an identification data of the event participant with a biometric or identification data stored in conjunction with the tickets data within the database 105*a* of the video sharing platform 105.

Once the entry ticket of the event participant is validated, they may be allowed to access or enter the event. Thereafter, the processor 203 is configured to facilitate the one or more event participants to upload the one or more multi-media content files upon validation. To this end, multiple event participants of the event may upload multiple content files relating to the event onto the video sharing platform 105, via their user devices 107.

In one example, the event participants may access a forum of the event on the video sharing platform 105 by presenting their validated entry tickets onto the forum. In another example, the event participants may gain access to the forum of the event on the video sharing platform 105 through a ticketing platform (associated with the ticketing module 203D) using which the event participant received or purchased the entry ticket. For example, when the entry ticket of the event participant is validated, they may be navigated to the forum for the event on the video sharing platform 105. Further, the processor 203 is configured to allow the event participants to upload the one or more multi-media content files on the forum of the event, such as via the input module 203A.

The processor 203, specifically, the input module 203A, is configured to receive the one or more multi-media content files 201B pertaining to the event from the plurality of user devices 107 associated with one or more event participants. In an embodiment, the one or more multi-media content files 201B encompass a wide range of digital media that incorporate various forms of content, such as videos, audio, images, texts, animations, and infographics. In an exemplary embodiment, videos can be in various formats such as MP4, AVI, or MOV that contain motion pictures and sound.

In certain cases, the processor 203 is configured to take the uploaded content files and enhance them to create better-quality versions.

Based on the received one or more multi-media content files, the classification module 203B may assign a quality score to each of the multi-media content files. The quality score may indicate a quality metric to indicate how well a content file is. It may be noted that various attributes of a content file are analyzed. For example, based on an event type of the event, various desired attributes of content relating to the event are identified. Further, the content files are analyzed to check if they contain these desired attributes. Based on this as well as assessment of overall quality of the content files, the quality scores may be assigned. In one example, if the event is a ball-based sport event, such as football, basketball, or cricket, then a high quality score would be given to content files or videos covering the movement of a ball in the event. In certain cases, a high quality score may also be allocated to content files or videos that relate to additional stories about the players of the event, teams, etc.

Further, based on the assigned quality scores, certain content files form the one or more video files are used to control the viewership of the event. In an example, controlling viewership of the event enables to engage the event participants as well as remote event viewers to create a community and harvest community spirit. Furthermore, the controlled viewership based on different content files may also increase revenue streams for organizers, widen fanbase, and enable certain event participants, such as athletes, artists, as well as viewers to engage with each other.

In an example, to engage viewers, the videos or content files with quality scores higher than a threshold are shared with multiple viewers of the event. For example, the processor 203 may ensure that the event participants who uploaded the content remain anonymous, so their personal information is not shared. For controlling the viewership, certain content files may also be merged or split and shared on the video sharing platform 105 for viewers that are not present at the event. This may create buzz about the event in real-time.

In certain cases, the classification module 203B is configured to generate one or more sharable multi-perspective multi-media content files based on the multi-media content files. For example, the sharable multi-perspective multi-media content files are generated by strategically combining certain parts of the content files having a quality score higher than a threshold. For example, for a ball-based sporting event, the sharable multi-perspective multi-media content files are generated by combining parts of various content files in which movement of ball is seen.

Subsequently, a quality score of the sharable multi-perspective multi-media content files is higher than the quality scores of the content files shared by the event participants.

The processor 203 is also configured to facilitate the one or more event participants to upload one or more multimedia content files without associating user data related to the one or more event participants. Further, the processor 203 is configured to identify one or more objects in the multimedia content files for emphasis. Furthermore, the processor 203 is configured to assign the quality score to each of the one or more multi-media content files based on at least presence, or absence, of the one or more objects, such as ball, player, artist, etc.

The processor 203 may collect and store past event recordings in the database 105*a*. Using these past recordings, the processor 203 trains a computer program such as the comparison-based model 201A on how to recognize different types of events and how popular they are among viewers. The processor 203 decides which multimedia content is suitable for viewing, considering the quality of the content and the type of event. The processor 203 identifies and emphasizes specific objects or things in the multimedia content. Each multimedia file is given a quality score based on various factors, including the presence or absence of certain objects. The objective of the processor 203 is to ensure that event participants can upload content, enhance the quality of that content, protect user privacy, and use historical data to decide what content is worth showing to viewers. It also emphasizes important objects and rates the quality of the content.

The processor 203, specifically, the classification module 203B, is configured to assign a quality score to each of the one or more multi-media content files 201B. In this regard, the trained comparison-based model 201A is used to assign the quality score.

In an example, the comparison-based model 201A is trained on a plurality of historical event recordings. In an embodiment, the historical event recordings correspond to a plurality of event types. For example, the historical event recordings may include event recordings relating to sports (such as basketball, football, cricket, hockey, ice-skating, rugby, etc.), different types of conferences or shows (such as trade shows, auto shows, and other conferences), social events, (such as birthdays, wedding, parties, etc.), cultural events (such as inaugurations, artistic exhibitions, cultural festivals, shows, etc.), educational events (such as forums, symposiums, workshops, seminars, etc.).

In an example, the output module 203C is configured to retrieve the plurality of historical event recordings and train the comparison-based model 201A. For example, the comparison-based model 201A is trained to identify a plurality of event types and assign a training score to each of the plurality of historical event recordings based on corresponding event type and viewership. In an embodiment, the training score is assigned to each historical event recording during the training process of the comparison-based model 201A. This training score is determined based on factors such as the specific event type and the viewership metrics associated with each historical event recording. For example, in a scenario where the comparison-based model 201A is being trained to recognize various event types, such as sports events, music concerts, and conferences. During the training phase, the comparison-based model 201A analyzes a dataset of historical event recordings, each of which corresponds to one of these event types. The training score is assigned to each historical event recordings or different parts of multiple recordings to reflect its relevance and significance within its respective event category. Historical event recordings that received high viewership and positive engagement may be assigned a higher training score, indicating their effectiveness in engaging the audience. On the other hand, historical event recordings with lower viewership and limited engagement might receive a lower training score. By assigning training scores to historical event recordings, the comparison-based model 201A learns to prioritize and evaluate the relevance of different events, helping it make informed decisions in real-time when controlling viewership on the video sharing platform 105. This enables the system 101 to deliver content that aligns with user preferences and generates a more engaging and personalized viewing experience.

For instance, the comparison-based model 201A undergoes a training phase where it is exposed to multiple videos. Consider a sports event as an example; numerous videos from a particular type of sport, previously broadcast on various media channels, can be included in a training dataset. These videos serve as valuable references to discern patterns. By analyzing the content and characteristics of these reference videos, the model can learn to recognize characteristics of a good video for the particular type of sport. This acquired knowledge is then applied onto the received one or more multi-media content file to assess the contentment thereof.

In various embodiments, the comparison-based model 201A performs a variety of tasks involved in the processing of the received multimedia files. These tasks encompass a wide range of applications, and several common machine-learning models are employed for these purposes. Notable examples of such models include Convolutional Neural Networks (CNNs), Recurrent Neural Networks (RNNs), and Generative Adversarial Networks (GANs). In an embodiment, Convolutional Neural Networks (CNNs) are employed for tasks such as object detection, action recognition, and image classification within individual frames of video sequences. They excel at identifying objects, movements, and visual patterns within static images or video frames. In an embodiment, Recurrent Neural Networks (RNNs) handle sequential data in videos. This makes them highly suitable for tasks like video captioning, where descriptions are generated for the content of video sequences. They are also instrumental in video summarization, where key content is condensed, and in gesture recognition, which involves recognizing and interpreting human gestures within video data. In another embodiment, Generative Adversarial Networks (GANs) are used for video super-resolution, where they enhance the quality and resolution of videos. GANs are also used for style transfer, allowing for the transformation of the visual style of videos, and in the creation of deepfakes, which involve generating highly realistic yet synthetic video content. By incorporating these machine learning models into the comparison-based model 201A, the video sharing platform 105 gains the ability to perform a wide array of tasks related to multimedia file processing, offering versatility and adaptability to meet diverse user needs.

Once the comparison-based model 201A is trained, the classification module 203B of the processor 203 is configured to utilize the trained comparison-based model 201A to assess the one or more multi-media content files 201B. In an example, the trained comparison-based model 201A may assign a quality score to each of the one or more multi-media content files 201B. For example, for a sport event, media content pertaining to a particular highlight part, such as a goal in football, a basket in basketball, a wicket or a boundary in cricket, lap completion in racing, etc. of the sport event may have higher quality score that other non-highlight part.

The processor 203 is then configured to control a viewership of the event in real-time based on the quality score of each of the multi-media content files 201B. In this regard, the comparison-based model 201A may identify an event type of the event based on the one or more multi-media content files 201B. Thereafter, the comparison-based model 201A is configured to assign the quality score to each of the one or more multi-media content files 201B based on the event type of the event as well as content of the corresponding one or more multi-media content files 201B.

Based on the assigned quality scores, the output module 203C is configured to generate output to control viewership of the event. For instance, videos that have a higher quality score are given priority placement in the generated output. For example, the generated output may be a time-series content to be promoted by the system 101 for engaging the event participants and/or other followers of the event. This prioritization of certain media files ensures that high-quality content is prominently featured for users. By presenting high-quality videos first, the system 101 actively engages users and exerts control over the viewership experience. The processor 203 plays a pivotal role in managing the tempo of event viewership. Depending on the desired user experience, the processor 203 can dynamically adjust the pace of content delivery. This may involve presenting content at a brisk and energetic tempo, a more relaxed and leisurely pace, or adhering closely to the originally uploaded content's pacing. Consequently, the processor 203 can tailor the viewership experience to align with specific preferences and requirements.

According to some embodiments, each of the comparison-based model 201A and the multi-media content files 201B may be embodied in the memory 201. The processor 203 may retrieve computer program code instructions that may be stored in the memory 201 for the execution of computer program code instructions, which may be configured for controlling the viewership.

The processor 203 may be embodied in a number of different ways. For example, the processor 203 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field-programmable gate array), a microcontroller unit (MCU), a hardware accelerator, a special-purpose computer chip, or the like. As such, in some embodiments, the processor 203 may include one or more processing cores configured to perform independently. A multi-core processor may enable multiprocessing within a single physical package. Additionally, or alternatively, the processor 203 may include one or more processors configured in tandem via the bus to enable independent execution of instructions, pipe-lining, and/or multithreading.

Additionally, or alternatively, the processor 203 may include one or more processors capable of processing large volumes of workloads and operations to provide support for big data analysis. In an example embodiment, the processor 203 may be in communication with the memory 201 via a bus for passing information to video sharing platform 105. The memory 201 may be non-transitory and may include, for example, one or more volatile and/or non-volatile memories. In other words, for example, the memory 201 may be an electronic storage device (for example, a computer-readable storage medium) comprising gates configured to store data (for example, bits) that may be retrievable by a machine (for example, a computing device like the processor 203). The memory 201 may be configured to store information, data, content, applications, instructions, or the like, to enable the processor 203 to carry out various functions in accordance with an example embodiment of the present disclosure. For example, the memory 201 may be configured to buffer input data for processing by the processor 203. As exemplarily illustrated in FIG. 2, the memory 201 may be configured to store instructions for execution by the processor 203. As such, whether configured by hardware or software methods, or by a combination thereof, the processor 203 may represent an entity (for example, physically embodied in circuitry) capable of performing operations according to an embodiment of the present disclosure while configured accordingly. Thus, for example, when the processor 203 is embodied as an ASIC, FPGA, or the like, the processor 203 may be specifically configured hardware for conducting the operations described herein. Alternatively, as another example, when the processor 203 is embodied as an executor of software instructions, the instructions may specifically configure the processor 203 to perform the algorithms and/or operations described herein when the instructions are executed. However, in some cases, the processor 203 may be a processor-specific device (for example, a mobile terminal or a fixed computing device) configured to employ an embodiment of the present disclosure by further configuration of the processor 203 by instructions for performing the algorithms and/or operations described herein. The processor 203 may include, among other things, a clock, an arithmetic logic unit (ALU), and logic gates configured to support the operation of the processor 203.

In some embodiments, the processor 203 may be configured to provide Internet-of-Things (IoT) related capabilities to users of system 101, where the users may be a viewer, a spectator, and the like. The system 101 may be accessed using the communication interface 205. The communication interface 205 may provide an interface for accessing various features and data stored in the system 101. For example, the communication interface 205 may comprise an I/O interface which may be in the form of a GUI, a touch interface, a voice-enabled interface, a keypad, and the like.

FIG. 3 illustrates a perspective view of an event participant 301 watching an event 303 and creating a multi-media content file using a user device 107, in accordance with one or more example embodiments. FIG. 3 is explained in conjunction with FIGS. 1-2. In the implementation, the video sharing platform 105 associates itself with an event entry mobile application. The event participant 301 installs the event entry mobile application on their user devices to book event ticket(s) and receive a QR entry code. This QR code is then validated at the event's entrance, streamlining the onboarding process for the event participant 301. The event entry mobile application facilitates efficient onboarding at the event entrance. The event entry mobile application features a self-presenting, non-closable QR code that functions like a pop-up, containing only the event entry QR code and essential event details such as time and location. In one embodiment, the QR code automatically appears within the event entry application at a predefined time set by the event host. This predefined time occurs any time before the event's commencement. In another example, the system 101 may use a geo-tagged location for activating the non-closable ticketing information when the user device is a certain distance away from a venue of the event. After the QR code is validated at the entry, the event entry mobile application continues to assist event participants 301 by enabling them to record the event 303, in this instance, a basketball game. Subsequently, the event participant 301 can upload the recorded videos to the video sharing platform 105. To streamline the process and prevent digital fumbling, various features of the event entry mobile application such as video creation and upload can only be accessed after the predefined time, starting from the moment the QR code is validated at the entry. In various embodiments, the videos captured or recorded at the events are organized on an event page administered by the host of the event. In one embodiment, these videos are typically in a vertical format and may include interactive features like 'likes' and 'comments'.

FIG. 4 illustrates a network environment 400 within which users may interact with the system 101, in accordance with one or more example embodiments. FIG. 4 is explained in conjunction with FIGS. 1-3. In an example, the event participant 301 may upload and share multi-media content files 201B onto the system 101. Further, one or more users, depicted as user 401, of the video sharing platform 105 over the network 103 may access and view content files uploaded by the event participants. In one embodiment, after capturing the videos, the event entry mobile application generates a shareable multi-perspective video and facilitates collaboration among event participants 301 and other event attendees and users 401 of the video sharing platform 105, without the need for a formal relationship. Users who attended the event and paid for it can view the event's videos on their user devices 107. Exclusive access to each event video is granted to users who attended and paid for the event. Some individual videos may be publicly viewable as part of the app's general feed. Users who did not attend the event do not have free access to the created videos. In an embodiment, the event entry mobile application is executable on the user devices 107 of the event participants 301 and the users 401 and implemented on one or more operating systems such as Android®, iOS®, Windows®, etc.

FIG. 5 is a flowchart of a method 500 for training the comparison-based model 201A, in accordance with one or more example embodiments. FIG. 5 is explained in conjunction with FIGS. 1-4.

The method 500 includes a step 501 of receiving a plurality of historical event recordings. The plurality of historical event recordings may include recordings of various types of events. For example, such recordings may be generated over time while covering these different types of events. In an example, the plurality of historical event recordings may be received or retrieved from a public database, or a private database storing these recordings.

The method 500 includes a step 503 of training the comparison-based model 201A based on the plurality of historical event recordings. In an example, the comparison-based model 201A is trained to identify a plurality of event types and assign a training score to each of the plurality of historical event recordings based on corresponding event type and viewership. In an example, the comparison-based model is trained to identify patterns of recordings that receive good engagement or viewership, for example, has been liked more, as well as patterns of recordings for a same event type that receive less engagement or viewership and may have less likes. For example, depending on an average number of people that engage in a particular event and specific number of people that are engaging in a particular recording as well as user feedback from plurality of users for the recording, the particular recording may be classified as positive or negative. Subsequently, patterns for good recordings and bad recordings are identified.

In an embodiment, the historical event recordings correspond to a plurality of event types. As an illustration, the comparison-based model 201A goes through a training phase during which it encounters a diverse set of videos. Take, for example, a sports event; numerous videos from that same sport, previously broadcast across various media channels, can be integrated into this training dataset. These videos serve as invaluable references for identifying recurring patterns. By scrutinizing the content and attributes of these reference videos, the model learns to distinguish the categories of videos that have been broadcasted previously. This newfound knowledge is subsequently applied to the video sharing platform 105 to categorize and identify the videos currently being uploaded. In various scenarios, the comparison-based model 201A executes a wide array of tasks related to the processing of the received multimedia files. These tasks span a broad spectrum of applications, and several well-established machine-learning models are deployed for these purposes. Prominent examples of such models include Convolutional Neural Networks (CNNs), Recurrent Neural Networks (RNNs), and Generative Adversarial Networks (GANs).

The method 500 includes a step 505 of assessing a suitable multi-media content file from the one or more training multi-media content files for controlling viewership. Once the comparison-based model 201A is trained, it may be tested on the one or more training multi-media content files. For example, during the testing, the comparison-based model 201A may analyze a recording to assign a training score to it. Based on the training score of the training multi-media content files, the comparison-based model 201A may learn which videos to upload or make visible to the public first. Moreover, based on an engagement of the uploaded video from the training multi-media content files having high training score, a loss function for the comparison-based model 201A may be determined. Based on the loss function, the comparison-based model 201A is retrained to update weights and improve accuracy.

FIG. 6A illustrates an exemplary flowchart of a method 600 for enabling entry of one or more event participants, according to some embodiments.

The method 600 then includes a step 601 of displaying a non-closable identifier corresponding to each of the one or more entry tickets on the plurality of user devices. The one or more entry tickets are associated with the one or more event participants. In an example, a non-closable identifier, such as a QR code or a bar code is displayed on a user device of a user in response to purchase of an entry ticket by the user for entry to an event. Due to the non-closable nature of the identifier of the entry ticket, the hassle of finding the entry ticket an entry of an event venue is minimized. This may reduce waiting time and improve onboarding experience.

The method 600 then includes a step 603 of receiving ticket data relating to each of the one or more entry tickets. In an example, the ticket data for an entry ticket corresponds to non-closable identifier is a QR (Quick Response) code or a barcode of the entry ticket. For example, the ticket data can be read based on scanning of the non-closable identifier using a digital device or a scanner.

The method 600 then includes a step 605 of validating the one or more entry tickets based on the corresponding ticket data. For example, after receiving the ticket data, an identifier of the entry ticket is matched with user data, such as name, identification number, photo, biometric, etc. Once validated, the user or the event participant is allowed entry to the event.

The method 600 then includes a step 605 of facilitating the one or more event participants to upload the one or more multi-media content files 201B. Upon validation, the user may be allowed to post or upload content files relating to the event on the video sharing platform 105.

FIG. 6B illustrates an exemplary flowchart of a method 610 for generating a video, according to some embodiments.

The method 610 then includes a step 611 of determining an event type of the event. For example, based on an object present or focused on the content files uploaded by the event participants, the event type of the event is determined. For example, even after identifying that the event is a sporting event, a determination is made to check what kind of sporting event it is.

The method 610 then includes a step 613 of facilitating event participants for uploading multimedia content files without associating user data related to event participants. In this manner, the event participants may upload content files anonymously. To this end, when the content files uploaded by the event participant are shared on the video sharing platform 105, the user data, such as name, social media handle, etc. of the event participant is obscured.

The method 610 then includes a step 615 of identifying one or more objects in multi-media content files 201B for emphasis. The one or more objects are identified based on the event type. For example, for an auto expo, the one or more objects would be cars or other vehicles on display. Similarly, for a sport, the one or more objects would be players, ball, etc.

The method 610 then includes a step 617 of assigning quality score to each of the multi-media content files 201B based on event type, and at least presence or absence, of the one or more object. For example, a content file or a video focusing on the identified one or more objects and having good quality would have high quality score. In an example, the quality score may be a numerical value in a range of, for example, 0 to 1, 0 to 10, 0 to 100, etc.

The method 610 then includes a step 619 of generating sharable multi-perspective multi-media content files based on multi-media content files 201B. In an example, the sharable multi-perspective multi-media content files are short-form or long-form videos. For example, the generated sharable multi-perspective multi-media content files are compilation videos comprising image sequences form different content files uploaded by the event participants. In an example, the sharable multi-perspective multi-media content files may include highlight parts, such as goals, player movements, player expressions, crowd cheer, etc. for a sport event. The sharable multi-perspective multi-media content files may have higher quality score than the content files uploaded by the event participants. In this way, user-generated data is used to create authentic videos representing the event.

FIG. 7 illustrates an exemplary flowchart of a method 700 for controlling viewership for an event, according to some embodiments. FIG. 7 is explained in conjunction with FIGS. 1-6.

The method 700 then includes a step 701 of receiving event entry data from plurality of user devices 107 associated with event participants of the event. The event entry data from a user device 107 comprises user identification data, event data, and a timestamp of the entry to the event. For example, the user identification data may include, but is not limited to, name, gender, age, a valid id number, biometric data, etc. Moreover, the event entry data relates is captured based on scanning of the non-closable identifier generated for an entry ticket for the event participant. Further, the timestamp of the entry to the event may indicate a time of entry of the user or the event participant into the event. In an embodiment, the event entry data relating to an entry ticket present on the user device is transmitted to the system 101 or the video sharing platform 105.

The method 700 then includes a step 703 of receiving multi-media content files 201B pertaining to the event from user devices 107 associated with the event participants. For example, the event participants may record videos and/or capture images, audio, etc. and upload them onto the video sharing platform 105. Examples of multi-media content files 201B include but are not limited to videos, audio, images, texts, animations, and infographics.

The method 700 then includes a step 705 of assigning quality scores to each multi-media content file using the trained comparison-based model 201A. The quality score is a quality metric that indicates how good or bad the content file is purely from a point of view of viewership of the event.

The method 700 then includes a step 707 of controlling viewership of an event in real-time based on quality score of each of multi-media content files 201B. In an example, content files or videos or images with high quality score, say above a quality threshold, are used to engage viewers and event participants. In an example, the event participants may be rewarded for uploading content files for highlight part of the event. In another example, the content files or videos or images with high quality score are used to generate the sharable multi-perspective multi-media content files.

For example, videos that receive higher quality scores or are assigned greater weights are granted priority placement on the video sharing platform 105. This prioritization guarantees that top-quality content takes a prominent position for users to see. By featuring high-quality videos first, the method 500 actively engages users and exercises control over their viewing experience. The processor 203 assumes a critical role in orchestrating the tempo of event viewership. Depending on the desired user experience, the processor 203 has the flexibility to dynamically adapt the pace of content delivery. This adaptability may involve presenting content at a lively and energetic tempo, a more relaxed and leisurely rhythm, or closely adhering to the pacing of the originally uploaded content. Consequently, the processor 203 can personalize the viewing experience to align precisely with specific preferences and requirements.

In operation, the method begins by validating the entry tickets to ensure their legitimacy. Once confirmed, event participants are granted the opportunity to upload their multimedia content, such as photos and videos, related to the event they are attending. The method then takes these uploaded files and enhances them to create higher-quality versions, which are assigned higher-quality scores. Importantly, user data related to the event participants is kept private to protect their anonymity. In parallel, the method collects a repository of historical event recordings. These recordings serve as a valuable resource for training the comparison-based model 201A. This comparison-based model 201A is trained to recognize various types of events and to assess their popularity among viewers. With this training in place, the method 500 assesses the suitability of multimedia content for viewing, taking into account factors like quality and event type. Additionally, it identifies and emphasizes specific objects or elements within the multimedia content. Each piece of multimedia content is rated based on its quality, considering elements such as the presence or absence of specific objects.

The objective of the present method is to streamline the process of event participants sharing their content, enhance its quality, maintain user privacy, leverage historical event data for training, and carefully curate content for viewers while highlighting important elements. The quality of each piece of content is thoroughly assessed to ensure a high-quality viewing experience.

It will be understood that each block of the flow diagram of the methods 500, 600, 610 and 700 may be implemented by various means, such as hardware, firmware, processor, circuitry, and/or other communication devices associated with the execution of software including one or more computer program instructions. For example, one or more of the procedures described above may be embodied by computer program instructions. In this regard, the computer program instructions that embody the procedures described above may be stored by the memory 201 of the system 101, employing an embodiment of the present disclosure and executed by the processor 203. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flow diagram blocks.

Accordingly, blocks of the flow diagrams support combinations of means for performing the specified functions and combinations of operations for performing the specified functions for performing the specified functions. It will also be understood that one or more blocks of the flow diagram, and combinations of blocks in the flow diagram, may be implemented by special-purpose hardware-based computer systems that perform the specified functions, or combinations of special-purpose hardware and computer instructions.

Further using the methods described in the accompanying embodiments of the flowchart shown in FIGS. 5, 6A, 6B and 7, which implements the various functionalities of the system 101 described in FIG. 2, the viewership of the multimedia content is efficiently controlled. This is specifically advantageous in cases of presenting quality video content based on the quality scores assigned to each of the multimedia content files 201B. This is particularly useful for reducing the presentation of identical video content, as the system 101 accurately computes the quality scores of each of the multi-media content files 201B uploaded by the event participants.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system, comprising:
   a memory to store computer-executable instructions; and
   a processor configured to execute the computer-executable instructions to perform following actions:
   receive event entry data pertaining to entry of one or more event participants into an event;
   receive one or more multi-media content files pertaining to the event from a plurality of user devices associated with one or more event participants;
   determine an event type of the event based on the received one or more multi-media content files;
   identify, based on the determined event type of the event, desired attributes of content related to the event from the received one or more multi-media content files;
   assign, using a trained comparison-based model, based on the identified desired attributes of the content, a quality score to each of the received one or more multi-media content files, wherein
      the quality score corresponds to a quality of the content of the received one or more multi-media content files, and
      the trained comparison-based model is trained on a plurality of historical event recordings; and
   control a viewership of the event in real time based on the assigned quality score of each of the one or more multi-media content files.

2. The system of claim 1, wherein the plurality of historical event recordings corresponds to a plurality of event types.

3. The system of claim 1, wherein the processor is further configured to:
   cause to display a non-closable identifier corresponding to each of one or more entry tickets on the plurality of user devices, wherein the one or more entry tickets are associated with the one or more event participants.

4. The system of claim 3, wherein the processor is further configured to:
   receive ticket data relating to each of the one or more entry tickets, wherein the ticket data comprises the corresponding non-closable identifier;
   validate the one or more entry tickets based on the corresponding received ticket data; and
   upon validation, facilitate the one or more event participants to upload the one or more multi-media content files.

5. The system of claim 1, wherein the processor is further configured to:

generate one or more sharable multi-perspective multi-media content files based on the one or more multi-media content files, wherein the one or more sharable multi-perspective multi-media content files have a quality score higher than the quality score of the one or more multi-media content files.

6. The system of claim 1, wherein the processor is further configured to:

facilitate the one or more event participants in uploading the one or more multi-media content files without associating user data related to the one or more event participants.

7. The system of claim 1, wherein the processor is further configured to:

receive the plurality of historical event recordings;

cause to train the comparison-based model based on the plurality of historical event recordings to:

identify a plurality of event types based on the trained comparison-based model, and assign, based on corresponding event type and a viewership, a training score to each of the plurality of historical event recordings; and assess a suitable multi-media content file from the one or more multi-media content files for the controlling of the viewership.

8. The system of claim 1, wherein the processor is further configured to:

identify one or more objects in the one or more multi-media content files for emphasis; and assign the quality score to each of the one or more multi-media content files based on at least presence, or absence, of the one or more objects.

9. The system of claim 1, wherein the event entry data comprises user identification data, event data, and a time-stamp of the entry to the event.

10. A method, comprising:

receiving, from a server, event entry data pertaining to entry of one or more event participants into an event;

receiving one or more multi-media content files pertaining to the event from a plurality of user devices associated with one or more event participants;

determining an event type of the event based on the received one or more multi-media content files:

identifying, based on the determined event type of the event, desired attributes of content related to the event from the received one or more multi-media content files;

assigning, using a trained comparison-based model, based on the identified desired attributes of the content, a quality score to each of the received one or more multi-media content files, wherein the quality score corresponds to a quality of the content associated with received one or more multi-media content files, and the trained comparison-based model is trained on a plurality of historical event recordings; and controlling a viewership of the event in real-time based on the assigned quality score of each of the one or more multi-media content files.

11. The method of claim 10, further comprising displaying a non-closable identifier corresponding to each of one or more entry tickets on the plurality of user devices, wherein the one or more entry tickets are associated with the one or more event participants.

12. The method of claim 11, further comprising:

receiving ticket data relating to each of the one or more entry tickets, wherein the ticket data comprises at least the corresponding non-closable identifier;

validating the one or more entry tickets based on the corresponding ticket data; and upon validation, facilitating the one or more event participants to upload the one or more multi-media content files.

13. The method of claim 10, further comprising generating one or more sharable multi-perspective multi-media content files based on the one or more multi-media content files, wherein the one or more sharable multi-perspective multi-media content files have a quality score higher than the quality score of the one or more multi-media content files.

14. The method of claim 10, further comprising facilitating the one or more event participants in uploading the one or more multi-media content files without associating user data related to the one or more event participants.

15. The method of claim 10, further comprising:

receiving the plurality of historical event recordings;

training the comparison-based model based on the plurality of historical event recordings to:

identify a plurality of event types based on the trained comparison-based model, and assign, based on the identified event type and a viewership, a training score to each of the plurality of historical event recordings; and assessing a suitable multi-media content file from the one or more multi-media content files for the controlling of the viewership.

16. The method of claim 10, further comprising:

identifying one or more objects in the one or more multi-media content files for emphasis; and assigning the quality score to each of the one or more multi-media content files based on at least presence, or absence, of the one or more objects.

17. The method of claim 10, wherein the event entry data comprises user identification data, event data, and a time-stamp of the entry to the event.

18. A non-transitory computer-readable medium comprising code or instructions that, when executed, at least cause, or enable a processor to:

receive event entry data pertaining to entry of one or more event participants into an event;

receive one or more multi-media content files pertaining to the event from a plurality of user devices associated with one or more event participants;

determine an event type of the event based on the received one or more multi-media content files;

identify, based on the determined event type of the event, desired attributes of content related to the event from the received one or more multi-media content files;

assign, using a trained comparison-based model, based on the identified desired attributes of the content, a quality score to each of the received one or more multi-media content files, wherein the quality score corresponds to a quality of the content associated with the received one or more multi-media content files, and the trained comparison-based model is trained on a plurality of historical event recordings; and control a viewership of the event in real time based on the assigned quality score of each of the one or more multi-media content files.

* * * * *